June 5, 1934. M. G. WAKSMUNDZKA Re. 19,203

ARCH LIFT

Original Filed Feb. 25, 1933

Inventor

MARIA G. WAKSMUNDZKA

By B O'Neill

Attorney

Reissued June 5, 1934

Re. 19,203

UNITED STATES PATENT OFFICE 19,203

ARCH LIFT

Maria G. Waksmundzka, Washington, D. C.

Original No. 1,930,889, dated October 17, 1933, Serial No. 658,602, February 25, 1933. Application for reissue February 6, 1934, Serial No. 710,034

8 Claims. (Cl. 36—71)

My invention is an arch lift.

As is well known, the condition of fallen arch of the foot is due to the lowering of the internal cuneiform and the first metatarsal bones, and this is caused by the giving way of the muscles and ligaments adjacent to the articulated members. These bones have an outer generally concave outline in a longitudinal direction.

I have discovered that if a flexible and resilient lifting pad is positioned under the arch of the foot, adjacent to these bones, and of suitable shape and size to exert the proper upward and inward pressure upon these bones, near their articulated surfaces, that these bones will be gradually lifted and restored to their normal position. When this is done, the remaining bones of the foot will usually also return to their normal positions, and the foot will be restored to its natural shape and strength. The lifting pad, because of its flexibility and resilience, serves to exercise and massage the muscles and ligaments joining and covering these bones, so that the muscles and ligaments are strengthened to properly support and position the bones.

In the accompanying drawing, forming part of this specification, and in which the same numerals are employed to designate like parts throughout, Figure 1 is a plan view of an arch lift constructed in accordance with my invention.

Figure 1:
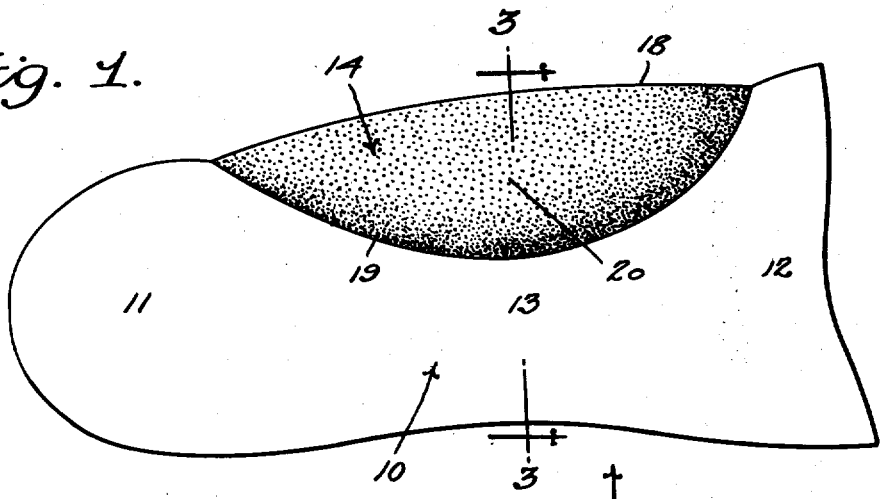
Figure 2:
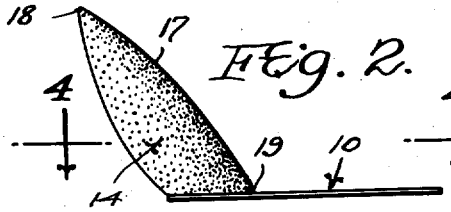
Figure 2 is an end elevation of the same arch lift.

The drawing shows a preferred embodiment of my invention. An attaching sole 10, formed of thin flexible material, such as leather, comprises a heel portion 11, a sole portion 12, and a constricted intermediate portion 13. The lifting pad 14 is flexible and resilient. The pad is formed preferably of rubber and is compressible and resilient, but is not as compressible as sponge rubber. The degree of compressibility may vary, but I have found that satisfactory results are obtainable by using a rubber having the same degree of compressibility as is found in the ordinary office rubber band.

Figure 3:
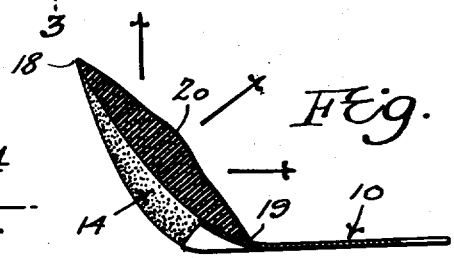
Figure 3 is a transverse section taken on line 3—3 of Figure 1.
Figure 4:
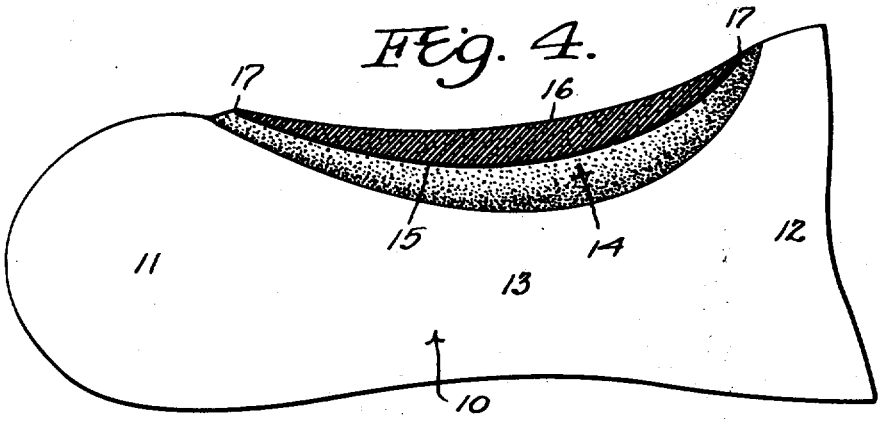
Figure 4 is a longitudinal section taken on line 4—4 of Figure 2.

An important aspect of the invention is the precise shape and arrangement of the lifting pad 14. The pad is longitudinally curved, as shown in Figure 4, and has an inner convex face 15 and an outer concave face 16. The pad tapers throughout its length, terminating in relatively thin edges 17. In cross section, as shown in Figure 3, the pad tapers upwardly to a thin edge 18 and downwardly to a thin edge 19, the thickest portion 20 being approximately at its center. The pad 14 is secured to the attaching sole 10 by cement or any equivalent means.

The pad 14, of course, is made in the proper size to fit the arch of the foot. The pad and sole are arranged within the shoe so that the pad is under the inner longitudinal arch of the foot. After the pad and sole are properly positioned in the shoe, the attaching sole 10 may be cemented or otherwise attached to the insole of the shoe to maintain the position of the pad relative to the foot.

Figure 5:
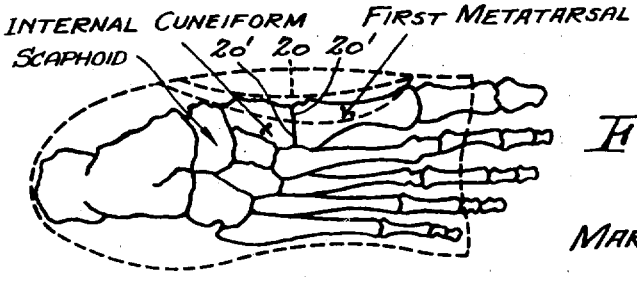
Figure 5 is a plan view of the bones of the foot, illustrating the application of my arch lift.

Figure 5 indicates the position that the lifting pad 14 assumes with respect to the bones of the foot. It will be noted that the internal cuneiform and first metatarsal bones, at the big-toe side of the foot, assume a generally convex position in a longitudinal direction. The convex shape of the face 15 permits the lifting pad to conform generally to this position of the bones. Further, the pad is so shaped that it exerts pressure inwardly upon the internal cuneiform and the first metatarsal bones. The shape of the pad 14 conforms to the outline of the normal arch, filling the hollow of such an arch when no weight is placed thereon. If the arch is not normal, the pad exerts a gentle pressure, tending to restore its natural contour.

The pad 14 is designed for the normal arch of the particular foot. That is, the pad is designed for a perfect arch, so that no pressure is exerted on such an arch. Of course, it is understood that a normal or perfect arch may be high or low, depending on the particular foot. Whenever the arch, either temporarily through tiredness, or chronically through misuse resulting in misplaced bones, tendons, or ligaments, aberrates from the norm of the perfect arch for that particular foot, the pad will exert a pressure upwardly and inwardly against the arch, the amount of pressure depending on the amount of sagging of the arch. In other words, the pad fits a normal arch, exerting no pressure thereon, but it exerts pressure whenever the arch is lower than normal. This arch is what is commonly known as the inner longitudinal arch, and the efficacy of my invention depends on the fact that no support whatsoever is to be placed under the outer side of the foot.

The lifting pad 14 is attached to the sole 10 along the curved line 19, and it will be noted that the pad 14 is without this line 19. In other words, the pad 14 is so designed that it exerts no pressure on any part of the sole of the foot that is normally in contact with the ground. There is no lifting pressure anywhere but on the arch of the foot. The thickest portion 20 of the pad is adapted to be positioned adjacent to the articulated ends 20′ of the internal cuneiform and the first metatarsal bones, and the pad 14 will exert an upward and inward pressure on the inner longitudinal arch of the foot. The pad being flexible and resilient, the bones will have freedom of motion and will at the same time be urged back to their normal positions. The sole 10 is relatively thin, and since the lifting pad 14 fits against the normal hollow arch, the wearer may disregard allowances for bulky supports and may wear the correct size of shoe.

My lift, therefore, will not only provide support for a normal foot, but will also tend to restore an arch which has sagged and wherein the bones are displaced. In some cases, the arch is displaced laterally without being lowered, and my lift will exert only a lateral pressure.

It is to be understood that the form of my invention herewith shown and described is only one embodiment of my invention, and that various changes in the shape, size, and arrangement of parts may be resorted to without departing from the spirit of my invention.

Having fully described my invention, what I claim is:

1. A device for supporting the inner longitudinal arch of the foot, said device being made in the proper size corresponding to the size of the shoe being worn, said device comprising a relatively thin attaching sole including a heel portion and an intermediate portion having a curved edge adjacent to the inner longitudinal arch, said attaching sole being adapted to be secured to the shoe in the correct position therein, and a flexible and resilient lifting pad secured to the attaching sole adjacent to the curved longitudinal edge thereof, the effective edge of attachment between the sole and pad being such that the major portion of the sole beneath the foot is uncovered by the pad, the lifting pad being transversely inclined and having the major portion of its area projecting laterally beyond the said effective edge of attachment, the lifting pad having a face which is longitudinally convex and transversely convex and having a maximum point of protuberance arranged near the center of such face, the lifting pad being so positioned upon the attaching sole that the maximum point of protuberance is arranged beneath and in substantial transverse vertical alignment with the articulated ends of the internal cuneiform and first metatarsal bones, the location of the lifting pad at the effective edge of attachment and its transverse inclination above and laterally beyond such effective edge of attachment bringing the maximum point of protuberance laterally outwardly of such effective edge of attachment, thereby causing the lifting pad to exert substantially vertical and horizontal pressures upon the inner longitudinal arch and resultant pressure at an angle of approximately 45° from the horizontal through the maximum point of protuberance which will elevate the end of the first metatarsal bone adjacent to the internal cuneiform bone and turn the same inwardly to the normal position.

2. A device for supporting the inner longitudinal arch of the foot, said device being made in the proper size corresponding to the size of the shoe being worn, said device comprising a relatively thin attaching sole including a heel portion and an intermediate portion having a curved edge adjacent to the inner longitudinal arch, said attaching sole being adapted to be secured to the shoe in the correct position therein, and a flexible and resilient lifting pad secured to the attaching sole adjacent to the curved longitudinal edge thereof, the effective edge of attachment between the sole and pad being such that the major portion of the sole beneath the foot is uncovered by the pad, the lifting pad being transversely inclined and having substantially its entire area projecting laterally beyond the said effective edge of attachment, the lifting pad having an inner face which is longitudinally convex and transversely convex and having a maximum point of protuberance arranged near the center of such inner face, the inner face being of such a length that it extends over and exerts pressure upon the first metatarsal, internal cuneiform, and scaphoid bones, the lifting pad being so positioned upon the attaching sole that the maximum point of protuberance is arranged beneath and in substantial transverse vertical alignment with the articulated ends of the internal cuneiform and first metatarsal bones, the location of the lifting pad at the effective edge of attachment and its transverse inclination above and laterally beyond such effective edge of attachment bringing the maximum point of protuberance laterally outwardly of such effective edge of attachment, thereby causing the lifting pad to exert substantial vertical and horizontal pressures and a resultant pressure at an angle of approximately 45° from the vertical through the maximum point of protuberance which will elevate the end of the first metatarsal bone adjacent to the internal cuneiform bone and turn the same inwardly to the normal position.

3. An arch support of the character described, comprising an attaching sole, and a flexible and resilient lifting pad secured to the attaching sole adjacent to the inner longitudinal edge thereof, the pad fitting against a normal hollow instep arch and being thickest at the area which lies substantially beneath the articulation of the first metatarsal and internal cuneiform bones.

4. An arch support of the character described, comprising an attaching sole, and a flexible and resilient pad secured to the attaching sole adjacent to the inner longitudinal edge thereof, the pad being substantially convex in both longitudinal and transverse sections and being thickest at the area which lies substantially beneath the articulation of the first metatarsal and internal cuneiform bones, whereby pressure is exerted upwardly and inwardly against the inner longitudinal arch of the foot when the arch sags below its norm.

5. The arch support set forth in claim 3, wherein the pad is convexo-convex in lateral vertical section at its thickest point.

6. The arch support set forth in claim 3, wherein the pad is concavo-convex in longitudinal horizontal section at its thickest point.

7. The arch support set forth in claim 3, wherein the pad is convexo-convex in lateral vertical section and concavo-convex in longitudinal horizontal section at its thickest point, whereby pressure is exerted upwardly and inwardly against the inner longitudinal arch of the foot when the arch sags below its norm.

8. An arch support of the character described, comprising an attaching sole, and a flexible and resilient pad secured to the attaching sole adjacent to the inner longitudinal edge thereof, the pad being thickest approximately at its center and tapering therefrom in all directions and so shaped that it fits against a normal hollow inner longitudinal arch, whereby the pad exerts pressure against the arch of the foot only when the arch sags below its norm, the center of the pad lying substantially beneath the articulation of the internal cuneiform and first metatarsal bones.

MARIA G. WAKSMUNDZKA.